United States Patent
Rudnick et al.

[11] Patent Number: 5,926,516
[45] Date of Patent: Jul. 20, 1999

[54] ABSORPTION STRUCTURE FOR ABSORBING NEUTRONS AND METHOD FOR PRODUCING AN ABSORPTION STRUCTURE

[75] Inventors: Karl-Heinz Rudnick, Dreieich; Manfred Tennie, Grossostheim; Günter Zeitzschel, Frankfurt, all of Germany

[73] Assignee: Siemens Aktiengesellschaft, Munich, Germany

[21] Appl. No.: 08/977,511

[22] Filed: Nov. 24, 1997

Related U.S. Application Data

[63] Continuation of application No. PCT/DE96/00838, May 13, 1996.

[30] Foreign Application Priority Data

May 24, 1995 [DE] Germany .................. 195 19 231

[51] Int. Cl.$^6$ .................................................. G21C 19/40
[52] U.S. Cl. ..................... 376/272; 376/288; 250/518.1
[58] Field of Search ...................... 376/272, 287, 376/288; 250/518.1

[56] References Cited

U.S. PATENT DOCUMENTS

| | | | |
|---|---|---|---|
| 3,056,028 | 9/1962 | Mattingly | 376/287 |
| 4,218,622 | 8/1980 | McMurtry et al. | 376/272 |
| 4,630,738 | 12/1986 | Bosshard | 376/272 |
| 4,711,758 | 12/1987 | Machado et al. | 376/272 |
| 4,746,487 | 5/1988 | Wachter | 376/272 |
| 5,032,348 | 7/1991 | Blum et al. | 376/272 |

FOREIGN PATENT DOCUMENTS

| | | |
|---|---|---|
| 0003226A1 | 8/1979 | European Pat. Off. . |
| 0186487A1 | 7/1986 | European Pat. Off. . |
| 0520438A1 | 12/1992 | European Pat. Off. . |
| 2638922 | 3/1978 | Germany .................. 376/287 |

*Primary Examiner*—Daniel D. Wasil
*Attorney, Agent, or Firm*—Herbert L. Lerner; Laurence A. Greenberg

[57] ABSTRACT

An absorption structure for absorbing neutrons and a method for producing the absorption structure include placing a neutron-absorbing material between a first sheet and a second sheet. The sheets are joined together and a plurality of voids is formed between them for receiving the neutron-absorbing material. At least one of the sheets has struts or bulges forming the plurality of voids and creating a material bond with the second sheet. The introduction of the neutron-absorbing material into the voids with a virtually arbitrary concentration also makes it possible to adjust the absorption capacity of the absorption structure within wide limits.

20 Claims, 1 Drawing Sheet

ABSORPTION STRUCTURE FOR ABSORBING NEUTRONS AND METHOD FOR PRODUCING AN ABSORPTION STRUCTURE

CROSS-REFERENCE TO RELATED APPLICATION

This application is a continuation of International Application Ser. No. PCT/DE96/00838, filed May 13, 1996.

BACKGROUND OF THE INVENTION

Field of the Invention

The invention relates to an absorption structure for absorbing neutrons, of the kind emitted by fuel assemblies of a nuclear reactor, for instance. The invention also relates to a method for producing such an absorption structure.

In order to achieve a desired neutron absorption, absorber parts in the form of various hollow shafts, canisters or similar configurations are typically produced, which surround a neutron-emitting object and thereby shield it. For instance, the use of such absorber parts permits the compact storage of neutron-emitting components, especially fuel assemblies, from nuclear reactors. In a fuel assembly storage frame which is known from Published European Patent Application 0 385 187 A1, absorber sheets, in the mounted state, form a number of hollow shafts that surround the fuel assemblies over their entire length. The hollow shafts formed of absorber sheets or absorber parts have a neutron-absorbing material, such as boron steel or boron-treated sheets.

The absorber parts are typically produced by introducing a certain proportion, for instance about 0.8 weight % of boron, into a molten parent metal. An absorber part made from that melt is then further processed into a hollow shaft, canister or other container. However, a disadvantage of that boron enrichment is that the parent material becomes brittle if boron above a certain concentration is smelted or incorporated into it, thus making further processing extremely difficult and even impossible in special applications.

Another possible way of producing absorber parts is to incorporate the neutron-absorbing material into a parent material, for instance of aluminum or plastic (plastic mat), and then to provide that parent material with austenitic sheets on both sides. However, as a result it cannot be assured in every case that there is a homogeneous distribution of boron within the parent material. The demand for a homogeneous distribution of the neutron-absorbing material within the absorber part must be met due to the risk of a criticality accident in nuclear reactors. Moreover, it must also be assured that dehomogenization within the absorber part will not occur, even later.

U.S. Pat. No. 4,218,622 describes a composite neutron absorber part, which has a thin carrier film or sheet, onto which a polymer matrix into which boron carbide particles have been incorporated, is applied. Fiberglass is preferably used as the material of the carrier film or sheet. The boron carbide particles are distributed uniformly on the surface of the polymer matrix, and a boron concentration of up to 0.1 g/cm$^2$ is achieved. When the composite absorber part is used in a fuel assembly storage basin, that absorber part has a thickness of up to 7 mm, is constructed in the form of a film or a sheet, and is suspended between an inner wall and an outer wall. The extent to which a homogeneous distribution of the boron carbide particles disposed on the surface of the polymer matrix is assured over a relatively long period, especially with a view to possible abrasion at the surface, cannot be learned from U.S. Pat. No. 4,218,622. The problems of a homogeneous distribution of neutron-absorbing material, both in terms of surface area and volume, are still largely present in the absorber part mentioned in U.S. Pat. No. 4,218,622.

SUMMARY OF THE INVENTION

It is accordingly an object of the invention to provide an absorption structure for absorbing neutrons and a method for producing an absorption structure, which overcome the hereinafore-mentioned disadvantages of the heretofore-known devices and methods of this general type and with which reliable shielding of an object that emits neutrons is assured with a high degree of absorption over an entire region to be shielded, even over a relatively long period of time, while avoiding the disadvantages discussed during usage as intended.

With the foregoing and other objects in view there is provided, in accordance with the invention, an absorption structure for absorbing neutrons, comprising a first metal sheet having members, such as struts or bulges; a second metal sheet secured to the members and defining a plurality of voids between the first and second metal sheets; and a neutron-absorbing material disposed in the voids.

The use of a plurality of voids, especially of a defined small volume, assures that after the neutron-absorbing substance has been introduced it will continue to be present even over a relatively long period of time at a given concentration in a defined, fixed three-dimensional region. Thus a homogeneous distribution of the neutron-absorbing substance in the absorption structure is also assured over a relatively long period of time. Furthermore, the inclusion of the neutron-absorbing material in voids of a defined volume makes it possible to introduce a high concentration of neutron-absorbing material, without affecting the load-bearing property with regard to both thermal and mechanical stresses on the absorption structure. A fuel assembly storage frame with this kind of absorption structure, given a suitable concentration of the neutron-absorbing substance, thus allows a far more compact storage of spent fuel assemblies than was previously possible. However, the absorption structure is also suitable, especially because of the largely arbitrarily adjustable content of neutron-absorbing material, for many areas of application that require shielding of neutrons. The mechanical and thermal stability which is given to the absorption structure through the use of the sheets may include well-known, proven materials.

The first and second sheets are preferably largely flat, and at least the first sheet has struts or bulges, at which it is firmly joined to the second sheet, forming the voids. Since only one of the sheets has struts or bulges, securing the other sheet to these struts or bulges is possible in an especially simple way, in particular by soldering and welding. This is particularly because accurate positioning of the sheets relative to one another is not needed then. If accurate positioning of the sheets relative to one another does exist, then the second sheet as well may be equipped with bulges or struts. The corresponding struts may be aligned directly adjacent one another and joined together. As a result, spacing apart of the sheets is attained by the struts, so that the voids formed by the struts and bulges have an increased depth. The shape and size of a cross-sectional area of the voids may be varied in many ways by the structure of the struts or bulges, and in particular the cross-sectional area may be rectangular, for instance square, rhomboid, or honeycomb-like. The struts or bulges may be produced in a simple way on a large industrial scale by stamping, embossing or casting processes.

In accordance with another feature of the invention, there is provided a lattice-like structure that forms the voids between the sheets. The sheets are solidly connected to lattice-like structure especially by soldering or welding on the opposed sides of the lattice-like structure. The lattice-like structure may be formed of a metal or ceramic material and can span voids having a cross-sectional area which can likewise be produced with a large variety of shapes.

In accordance with a further feature of the invention, the neutron-absorbing material is homogeneously distributed in each of the voids. To that end, it may be introduced in the form of a powder, a sintered material, with a viscous consistency, or in the form of a shaped body that is adapted to the shape of the void. It may be in crystalline or amorphous form, or a mixture of the two. The introduced neutron-absorbing material may also have a variable particle size within itself, and the quantity per unit of volume of neutron-absorbing material is variable. Through the use of a materially joined connection between the struts or bulges of one sheet and the other sheet, an entirely tight void is formed, so that the homogeneous distribution of the neutron-absorbing material is assured even over a long period of time.

In accordance with an added feature of the invention, the neutron-absorbing material has boron, hafnium or gadolinium. This substance is introduced into the void with a binder. For instance, the boron, hafnium or gadolinium can be smelted into a parent metal, incorporated into a plastic, or glued together through an organic or inorganic adhesive. The concentration of the neutron-absorbing material in the binder is up to between 80 and 90 weight %. As a result, a concentration, for instance of the boron, in the absorption structure that is markedly higher than in previously used absorption structures is attainable. Such an absorption structure is therefore also suitable for receiving and shielding neutron-emitting material, which is advantageous especially for the storage of spent fuel assemblies. When an adhesive with organic ingredients is used, then during the soldering of the sheets the organic ingredients maximally volatilize, so that there is largely no influence on the absorption behavior. When the voids are filled with virtually 100% neutron-absorbing material, its concentration in the absorption structure may be 10% or more. A high absorption capacity is thereby achieved.

An especially homogeneous distribution of the neutron-absorbing material in the absorption structure is attained through the use of many voids having a cross-sectional area that amounts to a few square centimeters.

In accordance with an additional feature of the invention, the cross-sectional area is in a range from 1 to 100 $cm^2$, in particular approximately 25 $cm^2$. This is equivalent to an edge length of 10 cm or less, for a square cross-sectional area. As a result, the danger of dehomogenization is largely precluded, even in the event of an unexpected tearing open of a void, since a shifting of the neutron-absorbing material from one void into another void would bring about hardly any substantial change in the distribution within the absorption structure.

In accordance with yet another feature of the invention, an absorption container for receiving a fuel assembly of a nuclear reactor is formed by the absorption structure. This absorption container can easily be produced through the use of the sheets that form the voids, within the above-described requisite mechanical and thermal capacity. Austenitic steels as well as zirconium or other materials permitted in nuclear power plant construction are suitable as material for the sheets.

In accordance with yet a further feature of the invention, the absorption structure is preferably used in a fuel assembly storage basin of a nuclear reactor to receive spent fuel assemblies. Due to the high attainable proportion of boron and the simultaneously high mechanical and thermal stability of the absorption structure, this structure is also suitable for use in dry storage facilities for spent fuel assemblies.

With the objects of the invention in view there is also provided a method for producing an absorption structure, which comprises joining two metal sheets together at members, such as struts, bulges or a lattice-like structure by soldering or welding, or by embossing or stamping the members on the sheet, defining voids between the metal sheets; and placing a neutron-absorbing material, in particular boron, hafnium and/or gadolinium, in the voids between the two metal sheets.

The sheets may be pretreated in such a way that soldering can be performed without further additives in a protective-gas atmosphere. Preferably, at least one sheet with struts or bulges is used, and the second, substantially flat sheet is soldered to these struts or bulges. During a successive, progressive soldering operation, the voids that remain between the sheets can likewise be filled with neutron-absorbing material in a specified amount. The filling with the neutron-absorbing material is accomplished, for instance, through the use of a binder, which both holds together the neutron-absorbing material and also produces an at least temporary bond with the curved sheet or the lattice-like structure. The binder can optionally escape nearly completely during soldering. Slippage or other escape of the neutron-absorbing material is prevented through the use of soldering with a flow of material in the voids formed by the struts or bulges, so that even a densification that proceeds for a long time can only impair the homogeneity of the boron distribution within the absorption structure to an extremely limited extent.

Other features which are considered as characteristic for the invention are set forth in the appended claims.

Although the invention is illustrated and described herein as embodied in an absorption structure for absorbing neutrons and a method for producing an absorption structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
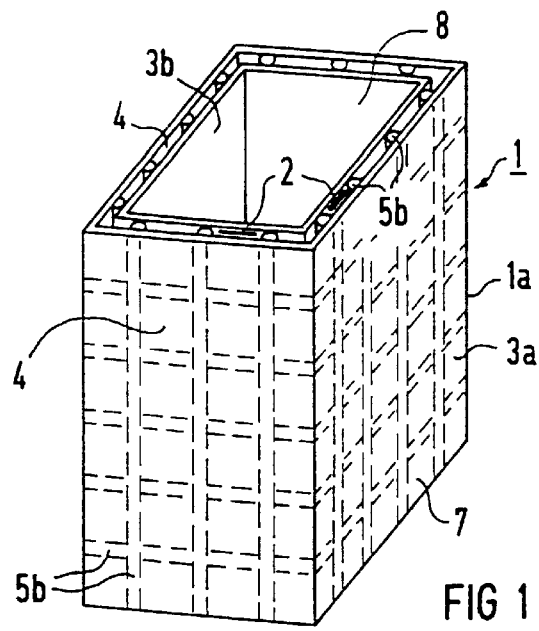
FIG. 1 is a diagrammatic, perspective view of an absorption structure that forms an absorption container.

Referring now to the figures of the drawings in detail and first, particularly, to FIG. 1 thereof, there is seen an absorption structure 1 that forms an absorption container 1a, which is suitable in particular for receiving and transporting neutron-emitting material, such as spent fuel assemblies of a nuclear reactor. The absorption container 1a has a rectangular cross section. An outer wall of the absorption container 1a is formed by four first sheets 3a, which have both horizontally and vertically extending embossed members in the form of bulges 5b, that are curved into the interior of the absorption container 1a. Respective associated second sheets 3b are secured to the bulges 5b and form an inner wall 8 of the absorption container 1a. Voids 4 are formed by the vertically and horizontally extending bulges 5b between a respective first sheet 3a and an associated second sheet 3b. A neutron-absorbing substance 2, in particular containing boron, hafnium or gadolinium, is inserted into these voids 4. The neutron-absorbing substance 2 may be in the form of sintered material, powdered material, viscous material, or a solid body. The members or bulges 5b may have been created in the respective first sheet 3a by stamping or embossing. They may also be welded or soldered onto the first sheet 3a, for example. Since the neutron-absorbing substance 2 is incorporated between the sheets loosely or even in stationary fashion, any permitted material, and in particular austenitic steel or zirconium, that has a requisite mechanical and thermal stability, may be used for the sheets.

Figure 2:
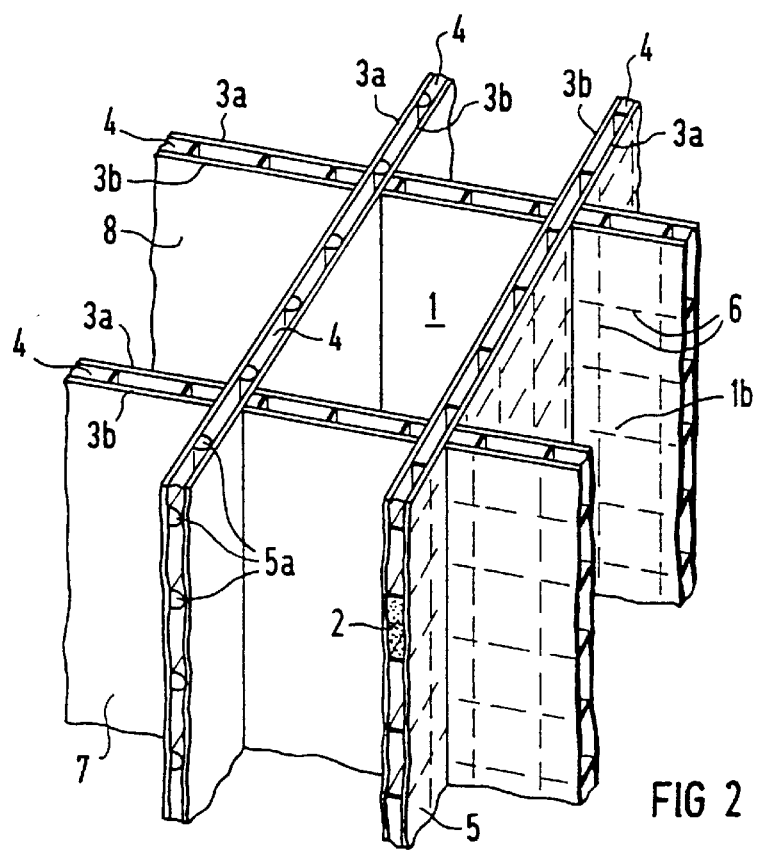
FIG. 2 is a fragmentary, perspective view of an absorption structure forming a plurality of hollow absorption shafts.

The perspective view of FIG. 2 shows an absorption structure 1 with which a plurality of absorption shafts 1b is formed. These absorption shafts 1b preferably serve for receiving spent fuel assemblies of a nuclear reactor. Each absorption shaft 1b has an inner wall 8 and an outer wall 7, respectively formed by first sheets 3a and second sheets 3b. Due to the spatial configuration, in the case of adjoining absorption shafts 1b, the inner wall 8 of one absorption shaft 1b is the outer wall 7 of the adjoining absorption shaft 1b. FIG. 2 shows members in the form of struts 5a, extending vertically and horizontally analogously to FIG. 1, between the first sheets 3a and the respective associated second sheets 3b. The struts 5a may have been created in one of the sheets 3a, 3b by embossing or stamping. Moreover, FIG. 2 shows members in the form of a lattice-like structure 6, which is disposed between a first sheet 3a and a second sheet 3b. The corresponding sheets 3a and 3b are soldered or welded to the lattice-like structure 6, so that voids 4 are formed through the use of the lattice-like structure 6 and the sheets 3a, 3b secured thereto. A neutron-absorbing substance 2 is inserted into the voids 4. The lattice-like structure 6 may be made from the same material, in particular metal, as the sheets 3a, 3b. It is equally possible to produce the lattice-like structure 6 of a different material, such as a ceramic material. The cross-sectional area and thus the shape of the voids 4 can be varied within wide limits through the use of the disposition and course of the members or struts 5a, bulges 5b, and lattice-like structure 6. In all cases, the neutron-absorbing substance 2 can be introduced into the thus-formed voids 4 in an arbitrary concentration, so that the absorption capacity of the absorption structure 1 can be selected within wide limits and for the most varied applications.

The invention is distinguished by an absorption structure which contains a neutron-absorbing substance that is incorporated between a first sheet and a second sheet. The sheets are joined together in such a way that a plurality of voids for receiving the neutron-absorbing substance is formed between them, and as a result a homogeneous distribution of the neutron-absorbing substance over the absorption structure is assured, even over a relatively long period of time. Abrasion of the neutron-absorbing substance, in particular boron, hafnium or gadolinium, and dehomogenization are practically precluded, especially through the use of the small volume of the voids. At least one of the sheets has members in the form of struts or bulges, which are produced on the sheet by embossing, stamping or soldering. As a result, many voids are formed in a simple way, by soldering a further sheet to these struts. Any permitted material, in particular an austenitic steel or zirconium, can be used for the sheets to suit a desired application. As a result, the absorption structure has high mechanical and thermal stability, as is needed, for instance, in applications in the field of nuclear technology, especially in fuel assembly storage basins and dry fuel assembly storage facilities. The neutron-absorbing material can be placed in the voids in a virtually arbitrary concentration, so that the absorption capacity of the absorption structure can also be adjusted in a simple way within wide limits, depending on the application.

We claim:

1. An absorption structure for absorbing neutrons, comprising:
    a first rigid metal sheet having integrated members;
    a second rigid metal sheet secured to said first metal sheet, said members defining a plurality of voids between said first and second metal sheets, and said voids being separated from each other by said members; and
    a neutron-absorbing material disposed in said voids; said rigid sheets providing a mechanical stability sufficient to support said neutron-absorbing material.

2. The absorption structure according to claim 1, wherein said members are struts.

3. The absorption structure according to claim 1, wherein said members are bulges.

4. The absorption structure according to claim 2, wherein said struts have a lattice-like structure.

5. The absorption structure according to claim 3, wherein said bulges have a lattice-like structure.

6. The absorption structure according to claim 1, wherein said neutron-absorbing material is distributed homogeneously in said voids.

7. The absorption structure according to claim 1, wherein said neutron-absorbing material is selected from the group consisting of a powder, a sintered material, a viscous material and a shaped body, filling a respective void.

8. The absorption structure according to claim 1, wherein said neutron-absorbing material contains an element selected from the group consisting of boron, hafnium and gadolinium.

9. The absorption structure according to claim 8, wherein said neutron-absorbing material is in a mixture with a binder, and said mixture has a proportion of said neutron-absorbing material of up to between 80 weight % and 90 weight %.

10. The absorption structure according to claim 1, wherein one of said voids has a cross-sectional area of from 1 to 100 $cm^2$.

11. The absorption structure according to claim 1, wherein one of said voids has a cross-sectional area of approximately 25 $cm^2$.

12. The absorption structure according to claim 1, wherein said first and second metal sheets form an absorption container for receiving a fuel assembly of a nuclear reactor.

13. The absorption structure according to claim 12, wherein said absorption container is part of a fuel assembly storage basin of a nuclear reactor.

14. A method for producing an absorption structure, which comprises:
    providing a first rigid structured metal sheet having members defining separated voids;
    providing a second rigid metal sheet;

joining the two metal sheets together at the members; and placing a neutron-absorbing material in the voids.

15. The method according to claim 14, which comprises joining the metal sheets together by soldering.

16. The method according to claim 14, which comprises joining the metal sheets together by welding.

17. The method according to claim 14, which comprises joining the metal sheets together at struts defining the members.

18. The method according to claim 14, which comprises joining the metal sheets together at bulges defining the members.

19. The method according to claim 14, which comprises joining the metal sheets together at a lattice-like structure defining the members.

20. The method according to claim 14, which comprises stamping or embossing the members in one of the sheets.

* * * * *